United States Patent
Bhattacharyya et al.

(10) Patent No.: US 12,483,753 B2
(45) Date of Patent: Nov. 25, 2025

(54) KALMAN FILTER BASED PREDICTIVE JITTER BUFFER ADAPTATION FOR SMOOTH LIVE VIDEO STREAMING

(71) Applicant: Tata Consultancy Services Limited, Mumbai (IN)

(72) Inventors: Abhijan Bhattacharyya, Kolkata (IN); Madhurima Ganguly, Bangalore (IN); Ashis Sau, Kolkata (IN); Suraj Kumar Mahato, Kolkata (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/740,859

(22) Filed: Jun. 12, 2024

(65) Prior Publication Data

US 2024/0422385 A1    Dec. 19, 2024

(30) Foreign Application Priority Data

Jun. 16, 2023    (IN) .............................. 202321041226

(51) Int. Cl.
*H04N 21/44* (2011.01)
*H04N 21/434* (2011.01)
(Continued)

(52) U.S. Cl.
CPC ... *H04N 21/44004* (2013.01); *H04N 21/4343* (2013.01); *H04N 21/435* (2013.01); *H04N 21/462* (2013.01)

(58) Field of Classification Search
CPC ......... H04N 21/44004; H04N 21/4343; H04N 21/435; H04N 21/462; H04N 21/434;
(Continued)

(56) References Cited

U.S. PATENT DOCUMENTS

| | | | |
|---|---|---|---|
| 8,588,071 B2 | 11/2013 | Mahkonen | |
| 2004/0240390 A1 | 12/2004 | Seckin | |

FOREIGN PATENT DOCUMENTS

RU    2 538 947 C1    1/2015

OTHER PUBLICATIONS

Fadlallah et al., "Video Streaming Based on Frame Skipping and Interpolation Techniques," International Journal of Innovative Science, Engineering & Technology, 3(7) (2016).
(Continued)

*Primary Examiner* — Anthony Bantamoi
(74) *Attorney, Agent, or Firm* — Finnegan, Henderson, Farabow, Garrett & Dunner, LLP (57) ABSTRACT

This disclosure provides a Kalman filter based predictive jitter buffer adaptation for smooth live video streaming. In the present disclosure, at receiver of a live video steaming system, reassembly of received data packets is performed to reconstruct different types of encoded frames transmitted by a transmitter. The different types of encoded frames are Full encoded frames in basic state and Delta encoded frames. To tackle data packet loss, the receiver is also equipped with a frugal yet efficient loss handling mechanism for both basic and delta frames. To achieve smooth rendering of the live video, the receiver employs a Kalman Filter based Jitter Buffer Adaptation mechanism. The Kalman Filter based Jitter Buffer Adaptation mechanism observes variability in arrival time of the open-loop best-effort traffic and adapts a jitter-buffer based on future end-to-end delay estimates. Thus, smoothness of streaming is preserved at the receiving end augmented with robust loss-resilience.

18 Claims, 9 Drawing Sheets

(51) Int. Cl.
*H04N 21/435* (2011.01)
*H04N 21/462* (2011.01)

(58) Field of Classification Search
CPC . H04L 41/5067; H04L 41/147; H04L 43/028; H04L 43/0858; H04L 43/087; H04L 47/283
See application file for complete search history.

(56) References Cited

OTHER PUBLICATIONS

Huang et al., "A Predictive Video-on-Demand Bandwidth Management Using the Kalman Filter over Heterogeneous Networks," The Computer Journal, 52(2) (2009).
Jasevičūtė et al., "Dynamic Adaptation of the Jitter Buffer for Video Streaming Applications," (2014).

FIG. 1

| Receiving, by a receiver executed by one or more hardware processors, a plurality of data packets of a plurality of target frames in a live video stream as input data from a transmitter | → 202 |

| Reconstructing, by the receiver executed by the one or more hardware processors, a current target frame from the plurality of target frames in the live video stream depending upon a type of the current target frame, wherein the current target frame is reconstructed in accordance with a corresponding structural alignment of each of the plurality of the data packets of the current target frame using a metadata information contained in a plurality of packet headers of each of the plurality of the data packets | → 204 |

| Performing in a simultaneous manner, by the receiver executed by the one or more hardware processors: (i) rendering of the reconstructed current target frame on a visual display unit; and (a) computing, a one-way delay of the rendered current target frame based on an average of the one way delay computed for each of the plurality of data packets of the current target frame; (b) computing one way delay gradient for the rendered current target frame based on a difference of the one way delay of the rendered current target frame and the one way delay of a previous target frame; (c) predicting, by the receiver executed by the one or more hardware processors, a value of the one way delay gradient for an incoming target frame using a Kalman filter-based adaptive jitter buffer unit, wherein the Kalman filter-based adaptive jitter buffer unit utilizes values of one or more reception parameters as input to predict the value of the one way delay gradient for the incoming target frame; and (d) reconstructing and rendering the incoming target frame after waiting for the defined time period such that smoothness of the live video stream is maintained. | → 206 |

KALMAN FILTER BASED PREDICTIVE JITTER BUFFER ADAPTATION FOR SMOOTH LIVE VIDEO STREAMING

PRIORITY CLAIM

This U.S. patent application claims priority under 35 U.S.C. § 119 to: Indian patent application No. 202321041226, filed on Jun. 16, 2023. The entire contents of the aforementioned application are incorporated herein by reference.

TECHNICAL FIELD

The disclosure herein generally relates to the field of video streaming, and, more particularly, to Kalman filter based predictive jitter buffer adaptation for smooth live video streaming.

BACKGROUND

With the growing demand of multimedia applications and mobile Internet, expectation of the end-user for Quality of Experience (QoE) is rising rapidly. Minor distortions in the multimedia applications affect the degree of delight of the end user, who is very considerate of the video Quality of Experience (QoE). Conventional real-time live video streaming systems undermine end-user experience while trying to satisfy channel bitrate under constrained and lossy network condition. The resultant quality degradation, delay and freezing under constrained network conditions pose a critical hindrance in reliable deployment of delay-sensitive and freezing-sensitive interactive "phygital" applications such as the applications using tele robotics, and/or the like. There exist few conventional approaches adapting the jitter buffer delay for QoE centric live video streaming but these are not very accurate, or reliable.

SUMMARY

Embodiments of the present disclosure present technological improvements as solutions to one or more of the above-mentioned technical problems recognized by the inventors in conventional systems. For example, in one embodiment, a processor implemented method is provided. The processor implemented method, comprising receiving, by a receiver executed by one or more hardware processors, a plurality of data packets of a plurality of target frames in a live video stream as input data from a transmitter; reconstructing, by the receiver executed by the one or more hardware processors, a current target frame from the plurality of target frames in the live video stream depending upon a type of the current target frame, wherein the current target frame is reconstructed in accordance with a corresponding structural alignment of each of the plurality of the data packets of the current target frame using a metadata information contained in a plurality of packet headers of each of the plurality of the data packets; and performing in a simultaneous manner, by the receiver executed by the one or more hardware processors: (i) rendering of the reconstructed current target frame on a visual display unit; and (a) computing, a one way delay of the rendered current target frame based on an average of the one way delay computed for each of the plurality of data packets of the current target frame; (b) computing one way delay gradient for the rendered current target frame based on a difference of the one way delay of the rendered current target frame and the one way delay of a previous target frame; (c) predicting, a value of the one way delay gradient for an incoming target frame using a Kalman filter-based adaptive jitter buffer unit, wherein the Kalman filter-based adaptive jitter buffer unit utilizes values of one or more reception parameters as input to predict the value of the one way delay gradient for the incoming target frame; and (d) reconstructing and rendering the incoming target frame after waiting for the defined time period such that smoothness of the live video stream is maintained.

In another aspect, a system is provided. The system comprising a memory storing instructions; one or more communication interfaces; and one or more hardware processors coupled to the memory via the one or more communication interfaces, wherein the one or more hardware processors are configured by the instructions to: receive, a plurality of data packets of a plurality of target frames in a live video stream as input data from a transmitter; reconstruct, a current target frame from the plurality of target frames in the live video stream depending upon a type of the current target frame, wherein the current target frame is reconstructed in accordance with a corresponding structural alignment of each of the plurality of the data packets of the current target frame using a metadata information contained in a plurality of packet headers of each of the plurality of the data packets; and perform in a simultaneous manner: (i) rendering of the reconstructed current target frame on a visual display unit; and (a) computing, a one way delay of the rendered current target frame based on an average of the one way delay computed for each of the plurality of data packets of the current target frame; (b) computing one way delay gradient for the rendered current target frame based on a difference of the one way delay of the rendered current target frame and the one way delay of a previous target frame; (c) predicting, a value of the one way delay gradient for an incoming target frame using a Kalman filter-based adaptive jitter buffer unit, wherein the Kalman filter-based adaptive jitter buffer unit utilizes values of one or more reception parameters as input to predict the value of the one way delay gradient for the incoming target frame; and (d) reconstructing and rendering the incoming target frame after waiting for a defined time period such that smoothness of the live video stream is maintained.

In yet another aspect, a non-transitory computer readable medium is provided. The non-transitory computer readable medium are configured by instructions for receiving, a plurality of data packets of a plurality of target frames in a live video stream as input data from a transmitter; reconstructing, a current target frame from the plurality of target frames in the live video stream depending upon a type of the current target frame, wherein the current target frame is reconstructed in accordance with a corresponding structural alignment of each of the plurality of the data packets of the current target frame using a metadata information contained in a plurality of packet headers of each of the plurality of the data packets; and performing in a simultaneous manner: (i) rendering of the reconstructed current target frame on a visual display unit; and (a) computing, a one way delay of the rendered current target frame based on an average of the one way delay computed for each of the plurality of data packets of the current target frame; (b) computing one way delay gradient for the rendered current target frame based on a difference of the one way delay of the rendered current target frame and the one way delay of a previous target frame; (c) predicting, a value of the one way delay gradient for an incoming target frame using a Kalman filter-based adaptive jitter buffer unit, wherein the Kalman filter-based adaptive jitter buffer unit utilizes values of one or more reception parameters as input to predict the value of the one way delay gradient for the incoming target frame; and (d) reconstructing and rendering the incoming target frame after waiting for the defined time period such that smoothness of the live video stream is maintained.

In accordance with an embodiment of the present disclosure, the type of the current target frame are delta and basic.

In accordance with an embodiment of the present disclosure, the one way delay for each of the plurality of data packets of the current target frame is computed based on a difference of arrival time and transmission time of each data packet.

In accordance with an embodiment of the present disclosure, the one or more reception parameters include the one way delay gradient of the previous target frame.

In accordance with an embodiment of the present disclosure, the step of reconstructing and rendering of the incoming target frame is based on the predicted value of the one way delay gradient for the incoming target frame and a predetermined sleep time.

In accordance with an embodiment of the present disclosure, the predetermined sleep time is selected based on a maximum desired target frame rate.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 illustrates an exemplary flow diagram illustrating a method for Kalman filter based predictive jitter buffer adaptation for smooth live video streaming, using the system of FIG. 1, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

The present disclosure addresses unresolved problems of the conventional methods for the delay-sensitive interactive applications by providing a Kalman-filter based predictive mechanism on open-loop incident traffic at a receiver that helps an effective jitter buffer adaptation to maintain the smoothness of streaming. In the present disclosure, the Kalman filter based jitter buffer adaptation is deployed in real for streaming live motion over different actual long haul channel settings and performance is measured in terms of subjective and objective QoE metrics and screen-to-screen latency to prove the efficacy. The method of the present disclosure outperforms existing methods in subjective and objective QoE metrics and latency performance, despite incessant degradation or uncontrolled variability in the channel quality.

Embodiments of the present disclosure provide Kalman filter based predictive jitter buffer adaptation for smooth live video streaming. In the present disclosure, at receiver of a live video steaming system, reassembly of received data packets is performed to reconstruct different types of encoded frames transmitted by a transmitter. The different types of encoded frames are Full encoded frames in basic state (alternatively referred as basic frames) and Delta encoded frames. To tackle packet loss, the receiver is also equipped with a frugal yet efficient loss handling mechanism for both basic and delta frames. To achieve smooth rendering of the live video, the receiver employs a Kalman Filter based Jitter Buffer Adaptation mechanism. In other words, the receiver is equipped with a Kalman-filter based future delay prediction which observes variability in delays of consecutive data frames and adapts a jitter-buffer based on past end-to-end delay estimates. Thus, smoothness of streaming is preserved at the receiving end augmented with robust loss-resilience.

Referring now to the drawings, and more particularly to FIGS. 1 through 7C, where similar reference characters denote corresponding features consistently throughout the figures, there are shown preferred embodiments and these embodiments are described in the context of the following exemplary system and/or method.

Figure 1:
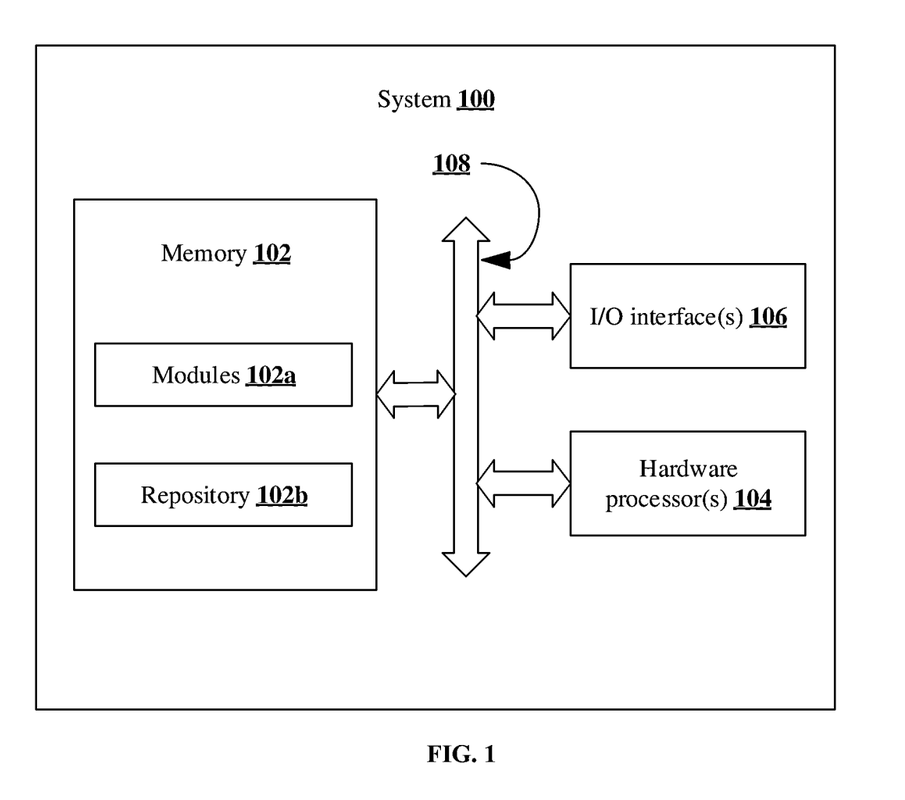
FIG. 1 illustrates an exemplary system for Kalman filter based predictive jitter buffer adaptation for smooth live video streaming according to some embodiments of the present disclosure.

FIG. 1 illustrates an exemplary system 100 for Kalman filter based predictive jitter buffer adaptation for smooth live video streaming according to some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

FIG. 2 illustrates an exemplary flow diagram illustrating a method for Kalman filter based predictive jitter buffer adaptation for smooth live video streaming, using the system 100 of FIG. 1, in accordance with some embodiments of the present disclosure.

Figure 3:
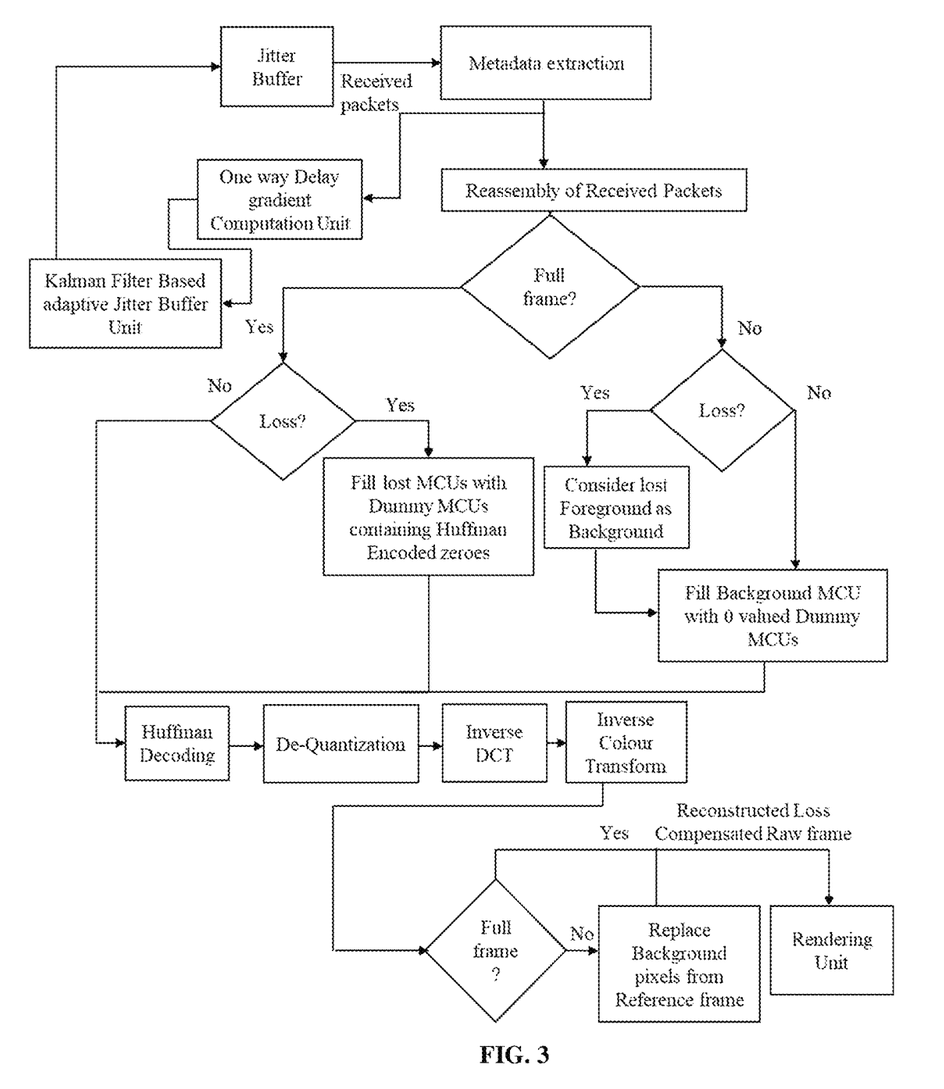
FIG. 3 is a functional block diagram of a receiver of a Quality Optimized Visual Anatomy-driven Dynamic and Intrinsically adaptive Streaming system using Kalman filter based predictive jitter buffer adaptation for smooth live video streaming, using the system of FIG. 1, according to some embodiments of the present disclosure.

Referring to FIG. 2, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the flow diagram of FIG. 3, the block diagram as depicted in FIG. 3, pictorial representations of FIG. 4A through 4C, and one or more examples. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

In an embodiment, at step 202 of the present disclosure, a receiver executed by the one or more hardware processors 104 is configured to receive a plurality of data packets of a plurality of target frames in a live video stream as input data from a transmitter. At each playout interval t, the receiver determines total number of expected data packets for each target frame from the plurality of target frames by parsing an offset field of a first data packet which contains position indicator for last expected data packet in each of the plurality of the target frames. The receiver computes an instantaneous error at time t as shown in equation (1) below:

$$E^t = \frac{N_{lost}}{N_{total}} \times 100 \qquad (1)$$

Here, $E^t$ represents the instantaneous error at time t, $N_{lost}$ represents estimated total number of data packets lost for a target frame, and $N_{total}$ represents total number of expected data packets for a target frame. Using $E^t$, the receiver computes a cumulative error $C_{mk}^t$, at play out-interval ending at t, starting from time t–k when the receiver last received a confirmable (CON) data packet as shown in equation (2) below:

$$C_{mk}^t := E^t + C_{mk}^{t-k} \qquad (2)$$

Along with this, the receiver maintains a log of $E^t$ for each t. Whenever the receiver receives a data packet sent via a Reliable mode on expiry of a periodic timer at time j, it computes a most frequent Error Rate within the interval between j and j–k as shown in equation (3) below:

$$P^j := \text{Mode}\left(E^j, E^{j-1}, \ldots \ldots \ldots, E^{j-k}\right) \qquad (3)$$

Here, $P^j$ indicates the most frequent Error Rate within the interval between j and j–k where the receiver last received a CON packet at j–k. In the context of the present disclosure, the reliable mode is referred to be as a mode in which a transmitter sends a data packet reliably. The transmitter sends a data packet reliably if it is first data packet of a basic/full frame or if it is first packet of a target frame for which a periodic timer expires on the transmitter end. The transmitter maintains the periodic timer to receive periodic feedbacks from the receiver indicating end-user video quality affected by instantaneous channel conditions. On expiry of the periodic timer, irrespective of a type of the current target frame, the transmitter sends the first data packet of the current target frame in the reliable/CON mode. For every data packet sent reliably via CON mode, the receiver piggybacks computed error statistics including cumulative and predominant error rate with an acknowledgment (ACK) of the CON packet. The receiver piggybacks $C_{mk}^t$ and $P^j$ with acknowledgment of the reliable data packet as periodic feedbacks to the transmitter. $C_{mk}^t$ and $P^j$ are indicative of end-user QoE and assist the transmitter in adaptively parameterizing spatio-temporal encoding functions.

Figure 4A:
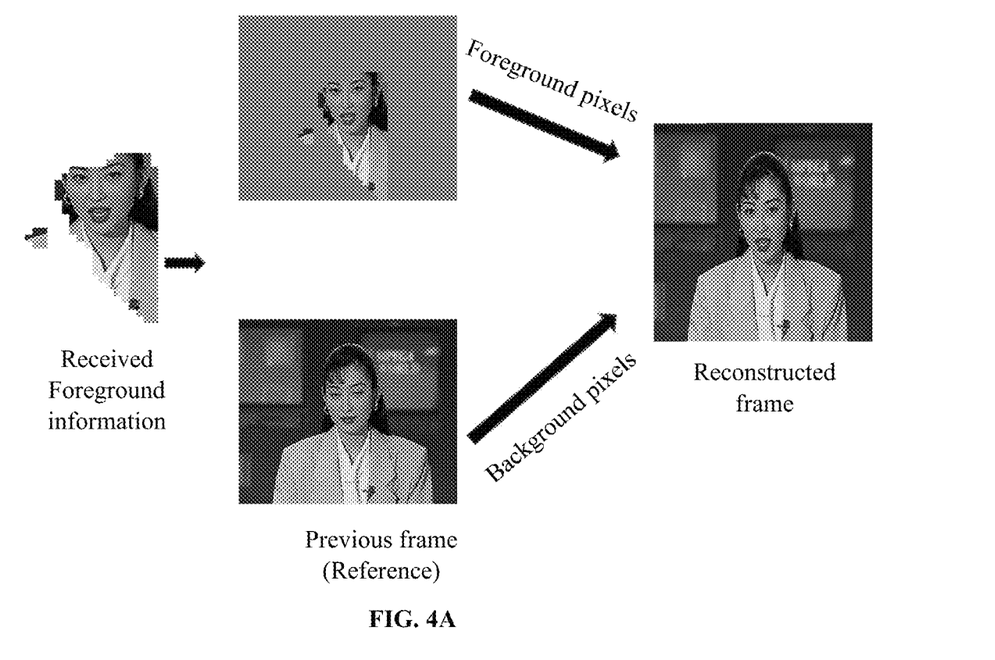
FIGS. 4A through 4C provide pictorial representations depicting reconstruction and loss compensation of a sample video frame at the receiver of a Quality Optimized Visual Anatomy-driven Dynamic & Intrinsically adaptive Streaming system using Kalman filter based predictive jitter buffer adaptation for smooth live video streaming, using the system of FIG. 1, according to some embodiments of the present disclosure.
Figure 4B:
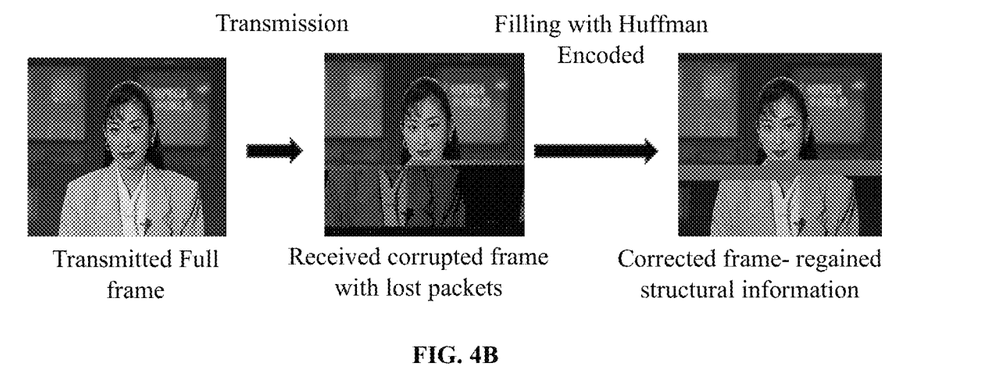
Figure 4C:
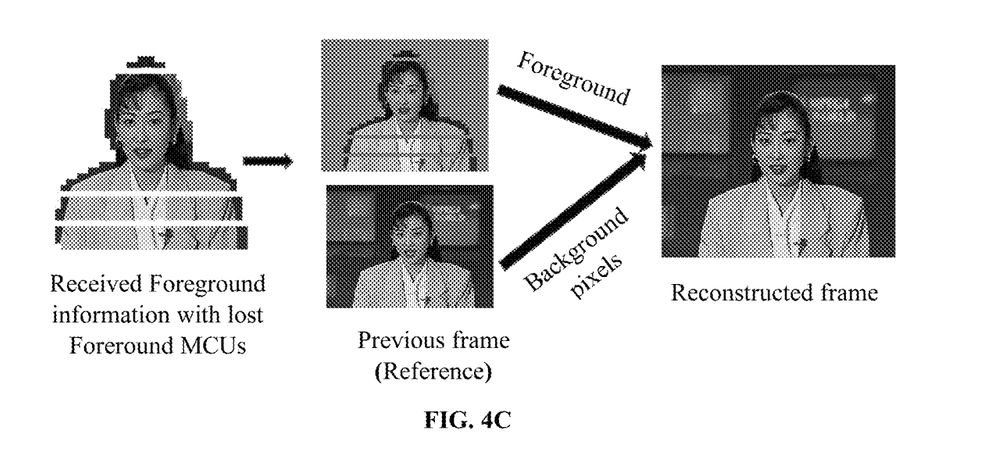

Further, at step 204 of the present disclosure, the receiver executed by the one or more hardware processors 104 is configured to reconstruct, a current target frame from the plurality of target frames in the live video stream depending upon a type of the current target frame. The current target frame is reconstructed in accordance with a corresponding structural alignment of each of the plurality of the data packets of the current target frame using a metadata information contained in a plurality of packet headers of each of the plurality of the data packets. The type of the current target frame are delta and basic. In the context of present disclosure, the basic frame is to be referred as a normal Joint Photographic Experts Group (JPEG) frame. The delta frame refers to the frames that consists of only encoded Foreground information. Foreground information of a current target frame is extracted based on scene changes of the current target frame from the previous target frame. FIG. 3 is a functional block diagram of the receiver of a Quality Optimized Visual Anatomy-driven Dynamic and Intrinsically adaptive Streaming system using Kalman filter based predictive jitter buffer adaptation for smooth live video streaming, according to some embodiments of the present disclosure. FIGS. 4A through 4C provide pictorial representations depicting reconstruction and loss compensation of a sample video frame at the receiver of a Quality Optimized Visual Anatomy-driven Dynamic and Intrinsically adaptive Streaming system using Kalman filter based predictive jitter buffer adaptation for smooth live video streaming, using the system 100 of FIG. 1, according to some embodiments of the present disclosure.

As shown in FIG. 3 and FIG. 4A, at each playout interval t, the receiver reassembles the received plurality of data packets for the current target frame as per their structural alignment in the frame using the metadata information contained in each packet header. For delta encoded frames, reassembly of received foreground Minimum Coded Units (MCUs) re-establishes structural sanctity of the frame as the transmitted delta frames contain just Foreground MCUs hence lack proper frame structure. Hence, for delta frame, reassembly is followed by filling background regions with dummy MCUs representing 0 valued pixels to facilitate reconstruction of the current target frame. The MCUs in JPEG encoded format are then converted back into raw pixel format by a normal JPEG decoding process. The normal JPEG decoding process flow includes Huffman decoding, de-quantization, inverse-DCT transform, and inverse colour transform as shown in FIG. 3. For Delta encoded frames, raw images include just foreground pixels and zero valued background pixels, hence 0 valued background pixels are replaced with corresponding pixels from immediate previous reference frame to form a complete reconstructed current target frame. The reconstructed current target frame hence formed serve as a reference for reconstruction of next delta frame.

In an embodiment, the receiver is equipped with a frugal yet robust loss concealment mechanism that attempts to compensate for the plurality of lost data packets to minimize effect of loss in a target frame without incurring any additional network overhead. The system 100 of the present disclosure does not try to regain lost SNR, rather cleverly modifies JPEG decoding structure and packet semantics to retrieve the structural information as much as possible with the available information received for a current target frame. As shown in FIG. 3, loss compensation is achieved differently for basic and delta Encoded frame. For a basic frame, as shown in FIG. 3 and FIG. 4B, the number of MCUs in the lost data packets of the current target frame are first determined using metadata information of received previous and next data packets. These lost MCUs are filled up with dummy MCUs comprising of Huffman encoded zeroes. This re-establishes the structural information of each of the plurality of target frames without attempting to regain the peak signal-to-noise ratio (PSNR), making the target frame acceptable in terms of end-user QoE thereby preventing it from getting discarded as corrupt frame. In case of loss in the Delta Encoded frames, the lost Foreground MCUs are considered part of background information of the frame, then reconstruction happens normally as it happens for delta Encoded frames as shown in FIG. 4C.

At step 206 of the present disclosure, the receiver executed by the one or more hardware processors 104 is configured to perform in a simultaneous manner rendering of the reconstructed current target frame on a visual display unit; and computing a one way delay of the rendered current target frame based on an average of the one way delay computed for each of the plurality of data packets of the current target frame. The one way delay for each of the plurality of data packets of the current target frame is computed based on a difference of arrival time and transmission time of each data packet. Further, a one way delay gradient for the rendered current target frame is computed based on a difference of the one way delay of the rendered current target frame and the one way delay of a previous target frame. In the system 100 of the present disclosure, the receiver does not get any feedback from the transmitter-side. So, future delay is required to be estimated by observing a variation in delays of consecutive data frames at the receiver. In the context of the present disclosure, the expression 'one way delay gradient' refers to a value measured in terms of difference of delay values of two consecutive data packets. However, for the system of the present disclosure, rather than concentrating on the data packets, the one way delay gradient is measured with respect to an entire target frame. If the plurality of data packets in the current target frame are received within a play-out boundary as an 'offset' field, it indicates highest packet index to be received for the concerned current target frame. Based on the history of frame-level one way delay gradients, the one way delay gradient $d^{t+1}$ for future target frame is predicted. In the present disclosure, a value of the one way delay gradient for an incoming target frame is predicted using a Kalman filter-based adaptive jitter buffer unit. Here, the incoming target frame indicates the future target frame. The Kalman filter-based adaptive jitter buffer unit utilizes values of one or more reception parameters as input to predict the value of the one way delay gradient for the incoming target frame. The one or more reception parameters include the one way-delay gradient of the previous target frame.

The step 206 is better understood by way of the following description provided as exemplary explanation.

In an embodiment, at each playout interval t, the one way delay incurred for data packet i of the rendered current target frame at time t is computed as shown in equation (4) below:

$$d_i(t) = A_i(t) - T_i(t) \qquad (4)$$

Here, $A_i(t)$ and $T_i(t)$ are the arrival and transmission times of the data packet i of the rendered current target frame t. Using $d_i(t)$ of each data packet i of the rendered current target frame, the delay incurred for frame at time t is computed as an average of delays incurred for all the data packets of the rendered current target frame at time t as shown in equation (5) below:

$$d(t) = \frac{1}{N}\sum d_i(t) \qquad (5)$$

Here i=1N and N is the total number of data packets received for the rendered current target frame at time t.

Using d(t) for the current target frame and previous target frame, the one way delay gradient $d_g(t)$ is computed as shown in equation (6) below:

$$d_g(t) = d(t) - d(t-1) \qquad (6)$$

Further, the system 100 of the present disclosure perform reconstruction and rendering of the incoming target frame after waiting for a defined time period such that smoothness of the live video stream is maintained. The defined timeout period for rendering and reconstruction of incoming target frame is based on the predicted value of the one way delay gradient for the incoming target frame and a predetermined sleep time. In an embodiment, the defined time period to perform reconstruction and rendering of the incoming target frame is a sum of the predicted value of the one way delay gradient for the incoming target frame and a predetermined sleep time. In an embodiment, the defined time period indicates the value of the jitter buffer for the incoming target frame. The predetermined sleep time is selected based on a maximum desired target frame rate. The historical measure of the one way delay gradient for the current target frame is fed into the Kalman filter that predicts the one way delay gradient $d^{t+1}$ for the next incoming target (i.e., next future) frame. Then, the Kalman filter-based adaptive jitter buffer unit is adjusted for the next incoming target frame as $d^{t+1}$+the predetermined sleep time. The Kalman Filter (KF) is used to predict the one way delay gradient of the incoming target frame using an actual measured value of the one way delay gradient of the rendered current target frame. For modelling the Kalman filter, the state equation(s) are defined as shown in equation (7) below:

$$m(t+1) = m(t) + \omega(t) \qquad (7)$$

Here, m(t) is the only state variable, which is model of the one way delay gradient. ω(t) represents state noise which is modeled as a stationary Gaussian process with zero mean and variance $Q(t)=E[\omega(t)^2]$. The output equation for Kalman Filter is as shown in equation (8) below:

$$d_g(t) = m(t) + \eta(t) \qquad (8)$$

Here, η) represents measurement noise and is modeled as stationary gaussian process just as the state noise with zero mean and variance $\sigma^2(t)=E[\eta(t)^2]$.

Figure 5:
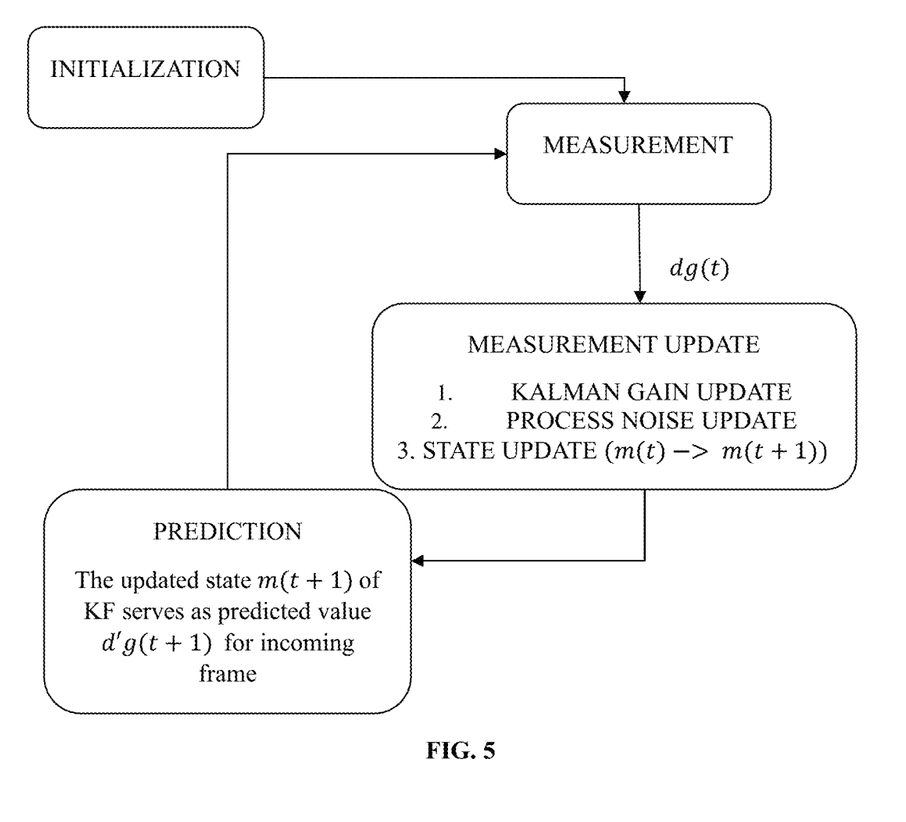
FIG. 5 illustrates an architectural diagram of the Kalman filter employed at the receiver of a Quality Optimized Visual Anatomy-driven Dynamic & Intrinsically adaptive Streaming system for smooth live video streaming, in accordance with some embodiments of the present disclosure.

FIG. 5 illustrates an architectural diagram of the Kalman filter employed at the receiver of a Quality Optimized Visual Anatomy-driven Dynamic & Intrinsically adaptive Streaming system for smooth live video streaming, in accordance with some embodiments of the present disclosure. As shown in FIG. 5, in initialization phase, the one way delay values for rendered first and second target frames are computed. The state of the Kalman Filter is initialized as the one way delay gradient value of the rendered second target frame received using the one way delay values of the rendered first and second target frame as shown in equation (9) below:

$$d_g(2) = d(2) - d(1) \qquad (9)$$

The value of the one way delay gradient of the rendered second target frame become the initial state of Kalman Filter as shown in equation (10) below:

$$m_{initial} = d_g(2) \qquad (10)$$

Further, as shown in FIG. 5, in measurement phase, the arrival time $A_i(t)$ for each data packet i of the rendered current target frame is measured and transmission time $T_i(t)$ of each data packet i contained in protocol header is determined. Further, the one way delay gradient $d_g(t)$ of the rendered current target frame t is computed. The computed value of the one way delay gradient for the rendered current target frame $d_g(t)$ is fed to the Kalman Filter. Next state of KF is estimated as a weighted sum of both measured value of one way delay gradient for the rendered current target frame and current state of the KF using the state update equation as shown in equation (11) below:

$$m(t) = (1 - K(t)) * m(t-1) + K(t) * d_g(t) \qquad (11)$$

The Kalman Filter has certain noise parameters that need to be tuned with each measurement update. In an embodiment, tunable parameters include a Kalman Gain (K(t)), Process Noise variance (P(t)), State Noise variance (Q(t)), and measurement noise variance ($\sigma^2(t)$). The Kalman Gain is used to determine weights in KF state update equation. It helps provide correction to estimation of the Kalman Filter using current measurement update. Kalman gain balances contributions from both the measured value of one way delay gradient and current state of KF to compute next state of KF. For example, more the value of K, more weight is given to measured value of one way delay gradient in estimating next state and vice versa. At each iteration, a Kalman gain update and a process noise update happens as shown in equations (12) and (13) respectively:

$$K(t) = \frac{P(t-1) + Q(t)}{P(t-1) + Q(t) + \sigma^2(t)} \qquad (12)$$

$$P(t) = (1 - K(t))P(t-1) + Q(t) \qquad (13)$$

After this, the state update is done using equation (11) to determine the next state of Kalman Filter, that provides an estimate of predicted value of one way delta gradient for the incoming target frame. In the prediction phase, the updated state of Kalman Filter m(t+1) is the predicted one way delay gradient value for the incoming target frame $d'_g(t+1)$. Optimum settings for the Kalman filter-based adaptive jitter buffer unit ensure smooth rendering following the delay variation in channel. Too low jitter buffer might lead to frame losses and too high jitter buffer may cause increased rendering latency.

Deployment and Experimental Results:

The system 100 of the present disclosure is implemented in C++ using OpenCV and Boost libraries and was built on Ubuntu 20.04 on a standard Intel Core i5 machine. The system 100 of the present disclosure was designed to live stream both stored videos and live camera feed. In the present disclosure, a parallel Web Real-Time Communications (WebRTC) implementation on JavaScript (JS) is created with media channel for video streaming and data channel for exchanging kinematic controls and feedbacks. The WebRTC system was also designed to transmit both stored video and live camera feed. The default video resolution was set at 640×480.

Figure 6A:
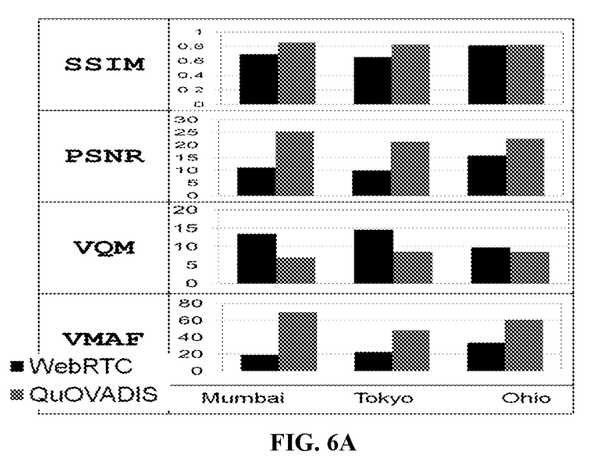
FIGS. 6A and 6B depict graphical representations illustrating experimental results in terms of visual quality under long haul for Kalman filter based predictive jitter buffer adaptation for smooth live video streaming, in accordance with some embodiments of the present disclosure.
Figure 6B:
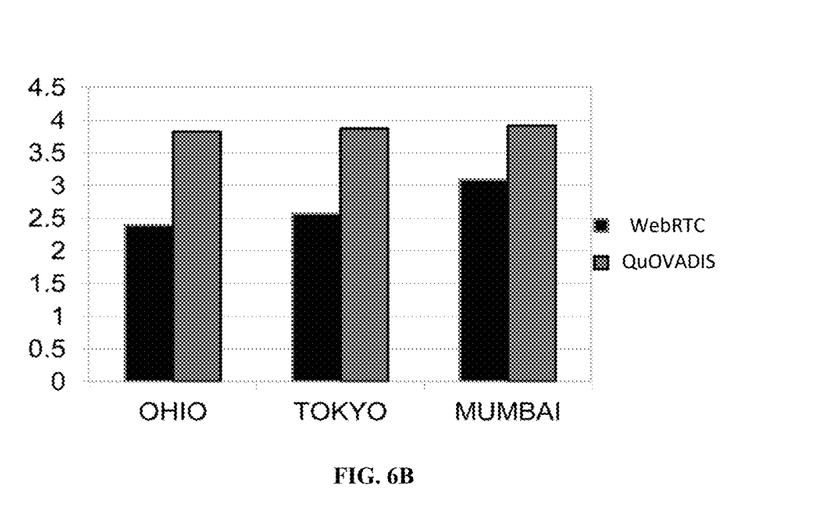
Figure 7A:
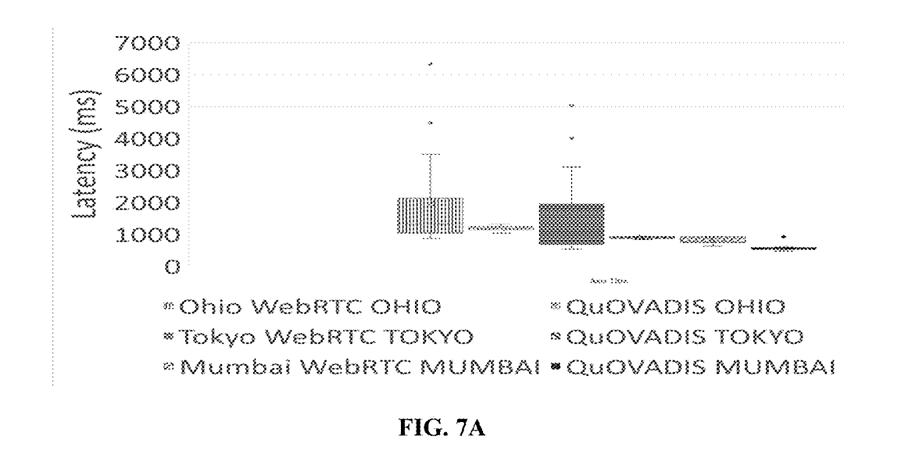
FIGS. 7A and 7B depict graphical representations illustrating scene to screen latency measurements for Kalman filter based predictive jitter buffer adaptation for smooth live video streaming, in accordance with some embodiments of the present disclosure.
Figure 7B:
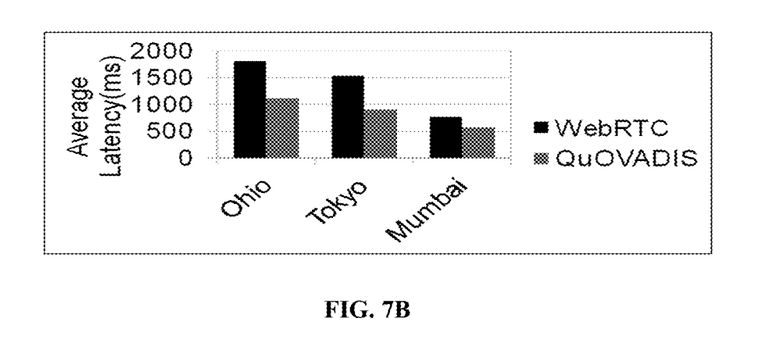

The system 100 of the present disclosure was deployed over a long-haul peer-to-peer (P2P) setting. The transmitter on a ported intake-car (Pi-car) was put at a first location (e.g., Kolkata, India). The operator console was in a second location (e.g., Bangalore, India). Both units were put in private networks behind restrictive network address translators (NATs) which do not allow hole punching. This ensured that WebRTC will always have to route through Traversal Using Relays (TURN) server. A User Datagram Protocol (UDP)-based relay service, co-located with the TURN server, was created for the system 100 of the present disclosure. The TURN and the relay servers were replicated in three different Amazon Web Services (AWS) instances in three different locations (e.g., Mumbai (India), Tokyo (Japan), and Ohio (US-east)). This way, tracking of performance under communication over Internet backbones running through different parts of the world, was done. The experiment was conducted in a real teleoperation scenario. A person in the first location (e.g., Kolkata, India) threw a ball on the floor in a given trajectory, and the person in the second location (e.g., Bangalore, India) had to track the ball by moving the Pi-car remotely. While WebRTC system was equipped with data channel for this purpose, a special control console was created for operating while observing feeds using the system of the present disclosure. Control commands were also relayed through same relay server. In the present disclosure, experiments were conducted on 20 users aged between 25-45 years. Each user was told to do a 'ball-tracking' exercise for 15 times in each sitting. Out of 15 times, traffic was routed through the three different locations (e.g., Mumbai (India), Tokyo (Japan), and Ohio (US-east) for 5 times each. The experiment was repeated for same subjects over a span of 5 days at different time of the day (i.e., morning, afternoon, evening). Each time, a stream was recorded for full referential measures of videos and operators in the second location (e.g., Bangalore, India) were told to mark their experience in a scale of 5. FIGS. 6A and 6B depict graphical representations illustrating experimental results in terms of visual quality under long haul for Kalman filter based predictive jitter buffer adaptation for smooth live video streaming, in accordance with some embodiments of the present disclosure. FIGS. 6A and 6B show full referential in terms of structural similarity index measure (SSIM), peak signal-to-noise ratio (PSNR), video quality metric (VQM), and Video Multimethod Assessment Fusion (VFAM) and mean opinion score (MOS) results respectively for Kalman filter based predictive jitter buffer adaptation for smooth live video streaming, in accordance with some embodiments of the present disclosure. The MOS results had an additional consideration for ease of operation by only looking at the video feed from the first location (e.g., Kolkata, India). FIGS. 7A and 7B depict graphical representations illustrating scene to screen latency measurements for Kalman filter based predictive jitter buffer adaptation for smooth live video streaming, in accordance with some embodiments of the present disclosure. In the present disclosure, a scene-to-screen latency is measured for traffic routed through the said routes (e.g., Mumbai (India), Tokyo (Japan), and Ohio (US-east). This was achieved by time synchronizing two smart phones with milliseconds clock in the second location (e.g., Bangalore, India) and Kolkata. The view of clock was streamed from the first location (e.g., Kolkata, India). In the second location (e.g., Bangalore, India), the mobile clock was set by the console and reception was recorded showing time in both screen and on the clock. Then, recorded video was paused at different instances for each recording and a time difference between the clock and screen-view for each paused screen was measured. FIG. 7A depicts a graphical representation illustrating comparative figures for motion-to-photon latency (scene-to-screen) for traffic routed through the said routes for Kalman filter based predictive jitter buffer adaptation for smooth live video streaming, in accordance with some embodiments of the present disclosure. FIG. 7B depicts a graphical representation illustrating an average latency observed in three different routes over a span of the experiment conducted for Kalman filter based predictive jitter buffer adaptation for smooth live video streaming, in accordance with some embodiments of the present disclosure. As expected, a larger latency variation was found in Ohio, followed by Tokyo and then Mumbai. Mumbai was the least as both peers were located in India. Ohio was the farthest. Though there were problems in synchronized operation due to inherent delay in the network, but regular freezing made the operation quite unrealizable in case of WebRTC. Several cycles of Ball throwing exercise were missed at the second location (e.g., Bangalore, India) due to video freeze. This observation was very frequent for Ohio-routed traffic as WebRTC was unable to adapt with the latency variation leading to frequent freezes. At-times, quality of reception also extremely deteriorated leading to inability to do any kind of teleoperation. But such problems were much less in case of the system of the present disclosure. The quality degradation happened quite gracefully. There was momentary reduction in reception rate during overshooting of end-to-end latency, but it could conceal loss of packets caused by the latency variation to the satisfaction of the users. Also, like the previous experiment, in this case also the system of the present disclosure performance improved almost in tandem with recovery of the network, but for WebRTC it took quite long time to recover from on-screen freezing despite recovery of the network.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein by the following claims.

What is claimed is:

1. A processor implemented method, comprising:
receiving, by a receiver executed by one or more hardware processors, a plurality of data packets of a plurality of target frames in a live video stream as input data from a transmitter;
reconstructing, by the receiver executed by the one or more hardware processors, a current target frame from the plurality of target frames in the live video stream depending upon a type of the current target frame, wherein the current target frame is reconstructed in accordance with a corresponding structural alignment of each of the plurality of the data packets of the current target frame using a metadata information contained in a plurality of packet headers of each of the plurality of the data packets; and
performing in a simultaneous manner, by the receiver executed by the one or more hardware processors:
(i) rendering of the reconstructed current target frame on a visual display unit; and (a) computing, a one way delay of the rendered current target frame based on an average of the one way delay computed for each of the plurality of data packets of the current target frame;
(b) computing one way delay gradient for the rendered current target frame based on a difference of the one way delay of the rendered current target frame and the one way delay of a previous target frame;
(c) predicting, a value of the one way delay gradient for an incoming target frame using a Kalman filter-based adaptive jitter buffer unit, wherein the Kalman filter-based adaptive jitter buffer unit utilizes values of one or more reception parameters as input to predict the value of the one way delay gradient for the incoming target frame; and
(d) reconstructing and rendering the incoming target frame after waiting for the defined time period such that smoothness of the live video stream is maintained.

2. The processor implemented method of claim 1, wherein the type of the current target frame are delta and basic.

3. The processor implemented method of claim 1, wherein the one way delay for each of the plurality of data packets of the current target frame is computed based on a difference of arrival time and transmission time of each data packet.

4. The processor implemented method of claim 1, wherein the one or more reception parameters include one way delay gradients of the previous target frame.

5. The processor implemented method of claim 1, wherein the step of reconstructing and rendering of the incoming target frame is based on the predicted value of the one way delay gradient for the incoming target frame and a predetermined sleep time.

6. The processor implemented method of claim 5, wherein the predetermined sleep time is selected based on a maximum desired target frame rate.

7. A system, comprising:
a memory storing instructions;
one or more communication interfaces; and
one or more hardware processors coupled to the memory via the one or more communication interfaces, wherein the one or more hardware processors are configured by the instructions to:
  receive a plurality of data packets of a plurality of target frames in a live video stream as input data from a transmitter;
  reconstruct a current target frame from the plurality of target frames in the live video stream depending upon a type of the current target frame, wherein the current target frame is reconstructed in accordance with a corresponding structural alignment of each of the plurality of the data packets of the current target frame using a metadata information contained in a plurality of packet headers of each of the plurality of the data packets; and
  perform in a simultaneous manner:
    (i) rendering of the reconstructed current target frame on a visual display unit; and
    (a) computing, a one way delay of the rendered current target frame based on an average of the one way delay computed for each of the plurality of data packets of the current target frame;
    (b) computing one way delay gradient for the rendered current target frame based on a difference of the one way delay of the rendered current target frame and the one way delay of a previous target frame;
    (c) predicting a value of the one way delay gradient for an incoming target frame using a Kalman filter-based adaptive jitter buffer unit, wherein the Kalman filter-based adaptive jitter buffer unit utilizes values of one or more reception parameters as input to predict the value of the one way delay gradient for the incoming target frame; and
    (d) reconstructing and rendering the incoming target frame after waiting for a defined time period such that smoothness of the live video stream is maintained.

8. The system of claim 7, wherein the type of the current target frame are delta and basic.

9. The system of claim 7, wherein the one way delay for each of the plurality of data packets of the current target frame is computed based on a difference of arrival time and transmission time of each data packet.

10. The system of claim 7, wherein the one or more reception parameters include the one way delay gradients of the previous target frame.

11. The system of claim 7, wherein the step of reconstructing and rendering of the incoming target frame is based on the predicted value of the one way delay gradient for the incoming target frame and a predetermined sleep time.

12. The system of claim 11, wherein the predetermined sleep time is selected based on a maximum desired target frame rate.

13. One or more non-transitory machine-readable information storage mediums comprising one or more instructions which when executed by one or more hardware processors cause:
receiving, by a receiver executed, a plurality of data packets of a plurality of target frames in a live video stream as input data from a transmitter;
reconstructing, by the receiver, a current target frame from the plurality of target frames in the live video stream depending upon a type of the current target frame, wherein the current target frame is reconstructed in accordance with a corresponding structural alignment of each of the plurality of the data packets of the current target frame using a metadata information contained in a plurality of packet headers of each of the plurality of the data packets; and
performing in a simultaneous manner, by the receiver:
  (i) rendering of the reconstructed current target frame on a visual display unit; and
  (a) computing, a one way delay of the rendered current target frame based on an average of the one way delay computed for each of the plurality of data packets of the current target frame;
  (b) computing one way delay gradient for the rendered current target frame based on a difference of the one way delay of the rendered current target frame and the one way delay of a previous target frame;
  (c) predicting, a value of the one way delay gradient for an incoming target frame using a Kalman filter-based adaptive jitter buffer unit, wherein the Kalman filter-based adaptive jitter buffer unit utilizes values of one or more reception parameters as input to predict the value of the one way delay gradient for the incoming target frame; and
  (d) reconstructing and rendering the incoming target frame after waiting for the defined time period such that smoothness of the live video stream is maintained.

14. The one or more non-transitory machine-readable information storage mediums of claim 13, wherein the type of the current target frame are delta and basic.

15. The one or more non-transitory machine-readable information storage mediums of claim 13, wherein the one way delay for each of the plurality of data packets of the current target frame is computed based on a difference of arrival time and transmission time of each data packet.

16. The one or more non-transitory machine-readable information storage mediums of claim 13, wherein the one or more reception parameters include one way delay gradients of the previous target frame.

17. The one or more non-transitory machine-readable information storage mediums of claim 13, wherein the step of reconstructing and rendering of the incoming target frame is based on the predicted value of the one way delay gradient for the incoming target frame and a predetermined sleep time.

18. The one or more non-transitory machine-readable information storage mediums of claim 17, wherein the predetermined sleep time is selected based on a maximum desired target frame rate.

* * * * *